United States Patent
Farooq et al.

(10) Patent No.: US 9,428,138 B2
(45) Date of Patent: Aug. 30, 2016

(54) ROLLOVER PASSENGER PROTECTION

(71) Applicant: Ford Global Technologies, LLC, Dearborn, MI (US)

(72) Inventors: Iskander Farooq, Novi, MI (US); Dean M. Jaradi, Macomb, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/566,817

(22) Filed: Dec. 11, 2014

(65) Prior Publication Data

US 2016/0167613 A1 Jun. 16, 2016

(51) Int. Cl.
| | |
|---|---|
| *B60R 21/231* | (2011.01) |
| *B60R 21/213* | (2011.01) |
| *B60R 21/216* | (2011.01) |
| *B60R 21/232* | (2011.01) |

(52) U.S. Cl.
CPC ........... *B60R 21/231* (2013.01); *B60R 21/213* (2013.01); *B60R 21/216* (2013.01); *B60R 21/232* (2013.01); *B60R 2021/23192* (2013.01)

(58) Field of Classification Search
CPC .. B60R 21/231; B60R 21/213; B60R 21/216
See application file for complete search history.

(56) References Cited

U.S. PATENT DOCUMENTS

| | | | |
|---|---|---|---|
| 3,606,377 A | 9/1971 | Martin | |
| 3,753,576 A | 8/1973 | Gorman | |
| 6,457,740 B1 * | 10/2002 | Vaidyaraman | B60R 21/231 |
| | | | 280/730.2 |
| 7,421,331 B2 * | 9/2008 | Damitz | F02D 35/023 |
| | | | 123/435 |
| 7,581,750 B2 | 9/2009 | Hirata et al. | |
| 7,722,074 B2 * | 5/2010 | Sugimoto | B60R 21/207 |
| | | | 280/728.2 |
| 7,862,074 B2 | 1/2011 | Deng et al. | |
| 7,878,531 B2 * | 2/2011 | Sugimoto | B60R 21/207 |
| | | | 280/730.1 |
| 7,926,840 B1 | 4/2011 | Choi | |
| 8,353,529 B2 * | 1/2013 | Tomitaka | B60R 21/231 |
| | | | 280/730.1 |
| 8,579,321 B2 | 11/2013 | Lee et al. | |
| 8,851,509 B1 | 10/2014 | Choi | |
| 9,016,717 B1 * | 4/2015 | Clauser | B60R 21/233 |
| | | | 280/729 |
| 2002/0036398 A1 | 3/2002 | Wahllbe | |
| 2002/0125690 A1 * | 9/2002 | Boll | B60R 21/213 |
| | | | 280/730.1 |
| 2006/0214401 A1 * | 9/2006 | Hirata | B60R 21/232 |
| | | | 280/730.1 |
| 2009/0174174 A1 * | 7/2009 | McCoy | B60R 21/0132 |
| | | | 280/749 |
| 2012/0119473 A1 * | 5/2012 | Lee | B60R 21/231 |
| | | | 280/728.2 |
| 2014/0232091 A1 * | 8/2014 | Gaiser | B60R 21/2171 |
| | | | 280/728.2 |
| 2014/0327234 A1 * | 11/2014 | Heurlin | B60R 21/207 |
| | | | 280/730.1 |
| 2014/0333053 A1 * | 11/2014 | Thomas | B60R 21/2338 |
| | | | 280/743.2 |

FOREIGN PATENT DOCUMENTS

| | | |
|---|---|---|
| DE | 2004032668 | 3/2013 |
| JP | H07186870 | 7/1995 |
| JP | 2008189023 | 8/2008 |
| KR | 100217646 | 6/1999 |

* cited by examiner

*Primary Examiner* — Darlene Condra
(74) *Attorney, Agent, or Firm* — Frank A. MacKenzie; Bejin Bieneman PLC (57) ABSTRACT

A passenger protection device includes an airbag having a roof panel arranged to deploy to cover at least a portion of and at least one tether having a first end attached to a first attachment point on a surface of the airbag that faces a vehicle roof when the airbag is deployed, and a second end attachable to a second attachment point.

19 Claims, 7 Drawing Sheets

ROLLOVER PASSENGER PROTECTION

BACKGROUND

Safety devices included in a vehicle interior may be passive, e.g., not activated before or upon an impact, or may be active, e.g., deployed when an impact is sensed or predicted. For example, airbags are passive safety devices that may be provided to deploy in an interior of the vehicle. However, existing airbags may not provide adequate occupant protection in all impact situations, e.g., a vehicle rollover.

DETAILED DESCRIPTION

With reference to the Figures, a vehicle rollover passenger protection system 50 includes a passenger protection device 10, the device 10 in turn including an airbag 20 and at least one tether 30. The airbag 20 includes a roof panel 22 that in a deployed state extends to cover at least a portion of an interior roof surface 70 and/or a rear window of a vehicle 100. Accordingly, the airbag 20 in a deployed state may extend over a head of a passenger in a rear seat of the vehicle 100, thereby providing protection during an impact such as a rollover event. The tether 30 has a first end 31 arranged for connection to a first attachment point 32 on a surface of the airbag 20 that faces a vehicle interior roof surface 70 or some other vehicle surface, e.g., a surface of windows 66 when the airbag 20 is deployed. Generally, the attachment point 32 is not provided on the impact surface 21. A second end 33 of the tether 30 is arranged for connection to a second attachment point 34.

The vehicle rollover passenger protection system 50 further typically includes a package tray 52, a cavity 54 being included in the package tray 52. A guide plate 56 is hingedly connected to the package tray 52 and covers the cavity 54. As described further below, the package tray 52 and cavity 54 can be used to stow the airbag 20. The guide plate 56 may be used both to cover and package the device 10 in a stowed state, as well as to guide deployment of the device 10, as is also described further below.

Figure 1:
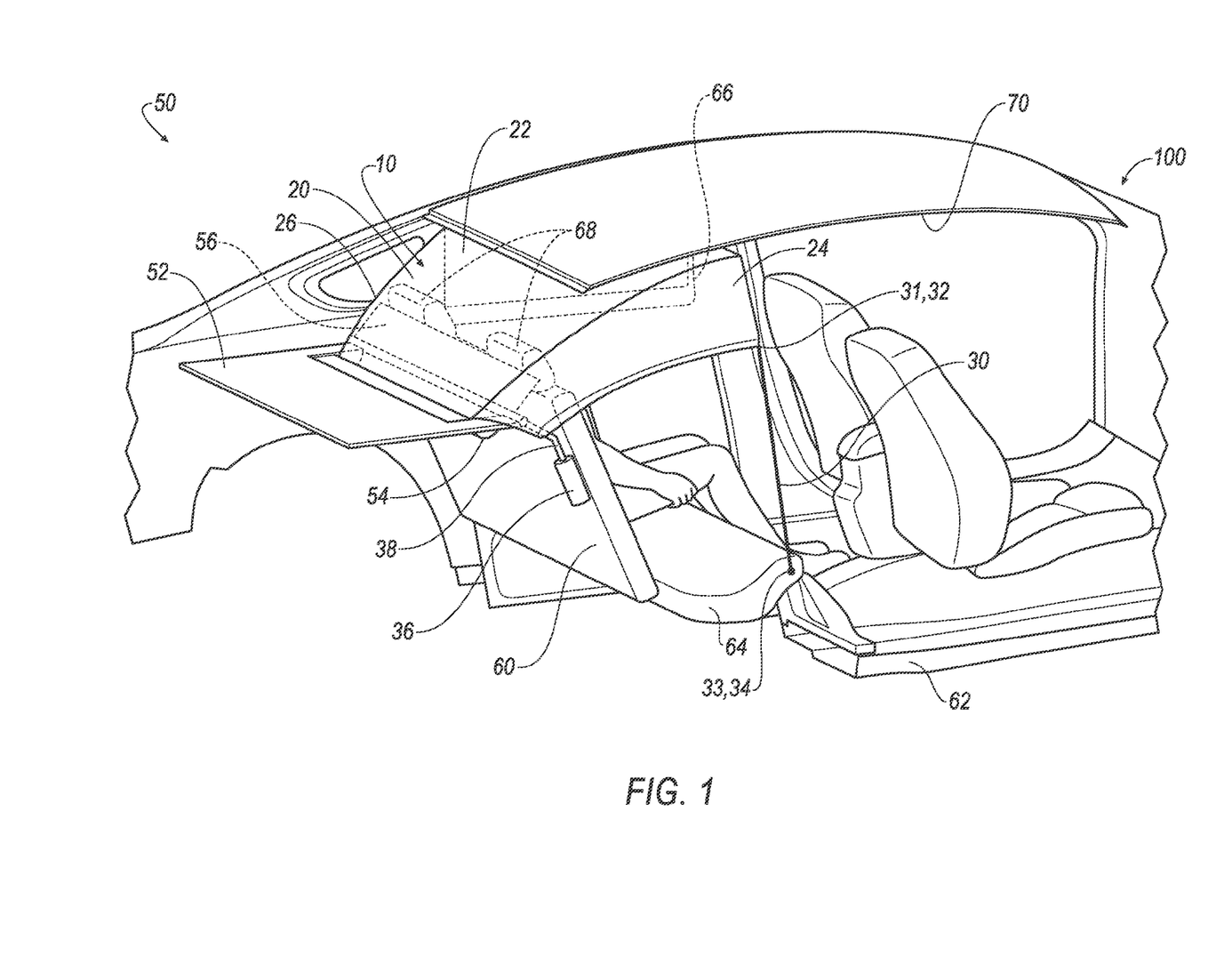
FIG. 1 is a perspective view of an exemplary rollover passenger protection system in a deployed state.
Figure 2:
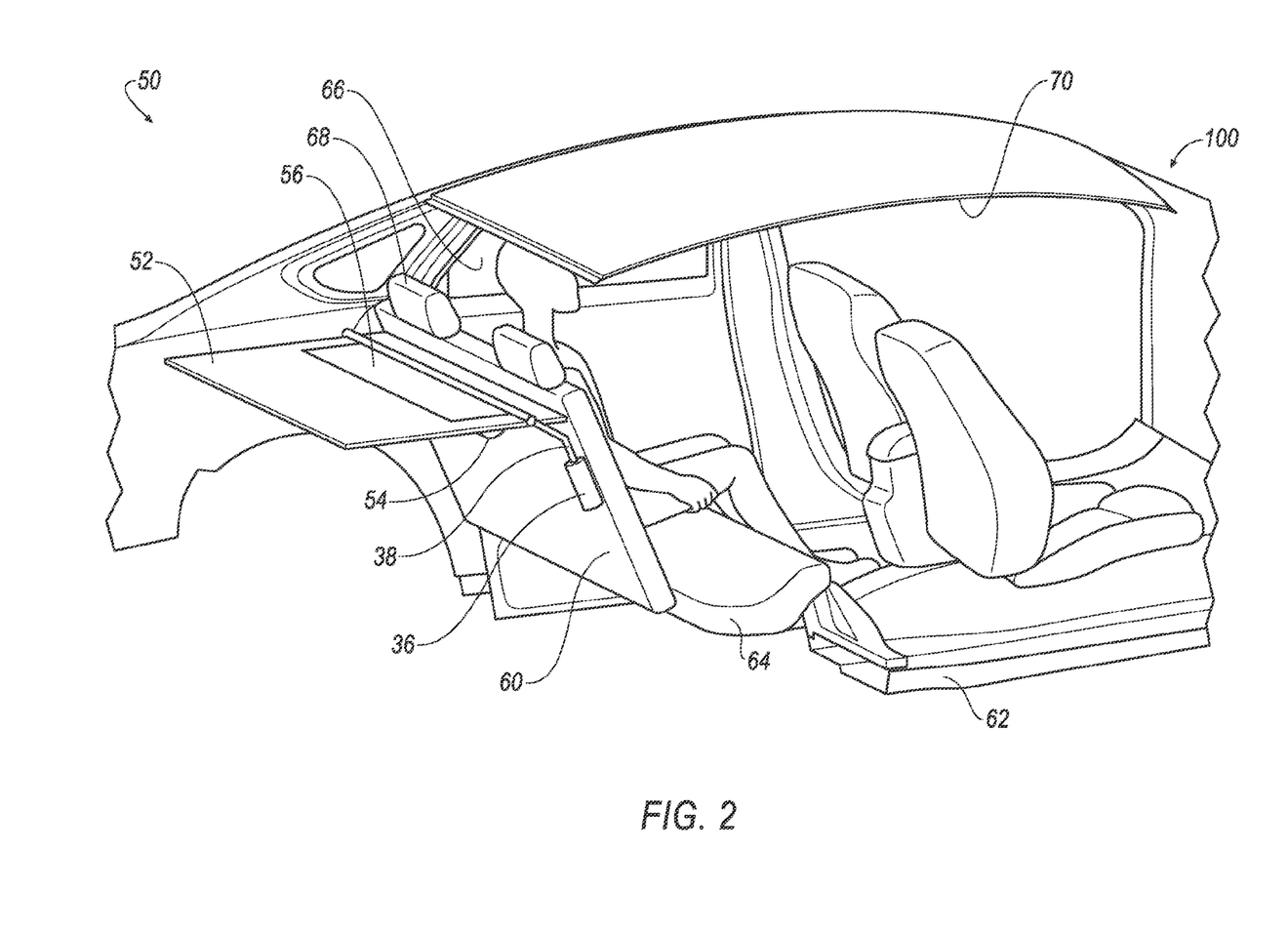
FIG. 2 is a perspective view of the rollover passenger protection system of FIG. 1 in a stowed (i.e., undeployed) state.
Figure 3:
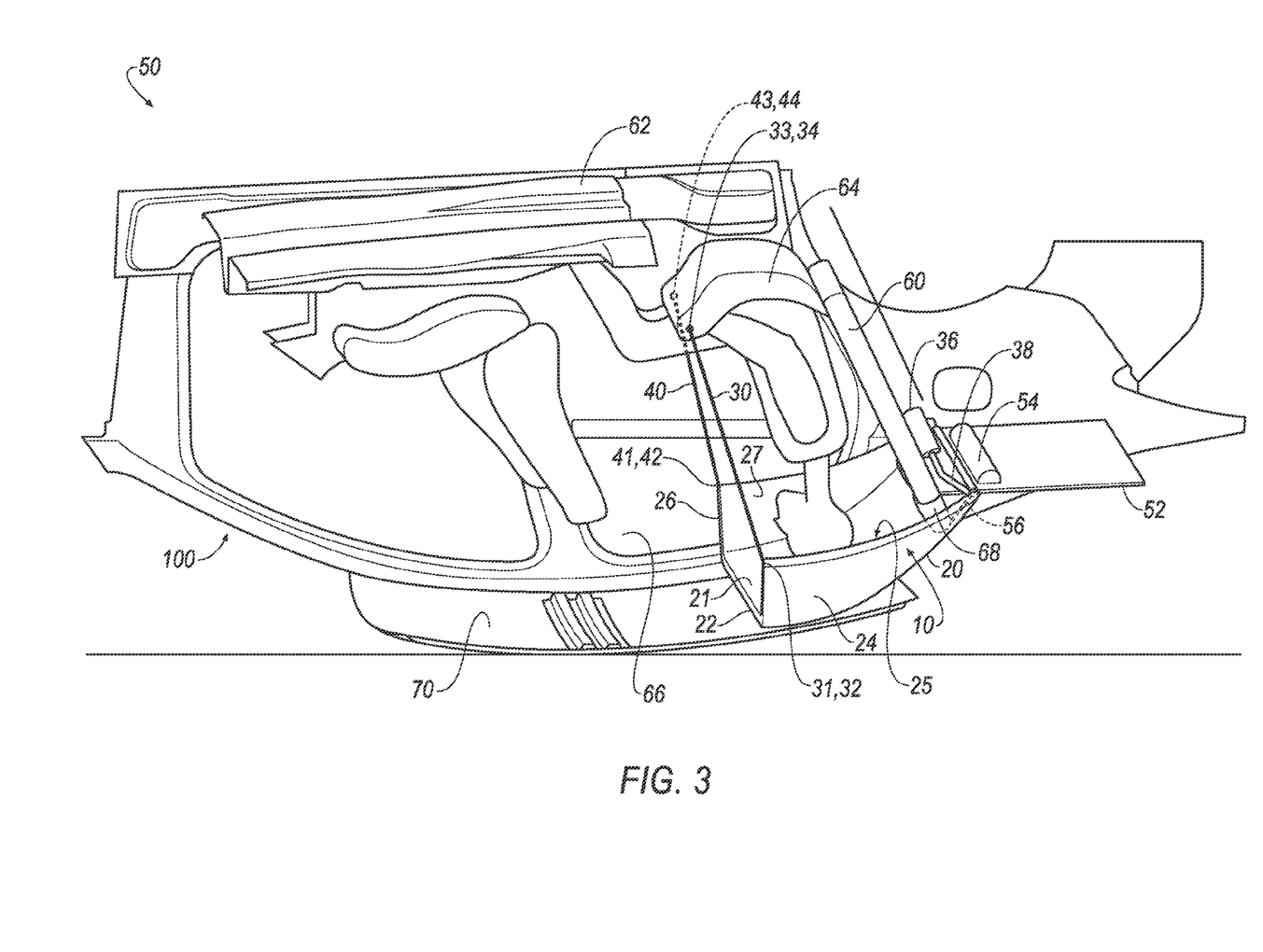
FIG. 3 is a perspective view of the rollover passenger protection system of FIG. 1 deployed during a rollover.
Figure 4:
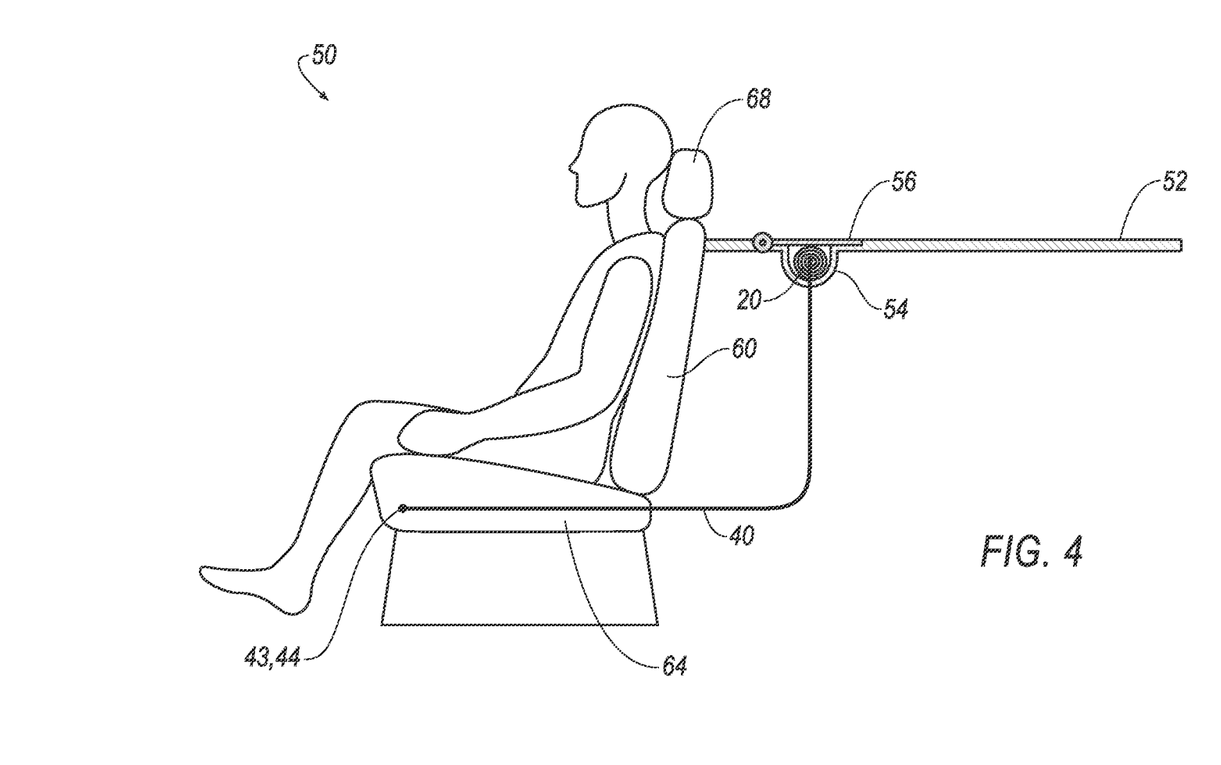
FIG. 4 is a side view of an exemplary passenger protection device in the stowed state.

The airbag 20 is arranged to absorb energy from a passenger during a rollover event, e.g., to provide enhanced passenger protection. The roof airbag panel 22 provides an impact surface 21 (see FIG. 3) for the passenger when the passenger moves vertically relative to the vehicle 100, e.g., toward the earth in a rollover situation. The surface of the panel 22 generally has a shape and dimensions determined by a shape and dimensions of the interior roof surface 70, and as such may be generally arcuate or some combination of arcuate and planar.

As shown in the drawings, although not necessary in all embodiments, the airbag 20 may further include a first side panel 24 extending below the roof panel 22 and a second side panel 26 extending below the roof panel 22 opposite the first side panel 24. In the illustrated embodiment, rear corners of the side panels 24, 26, as can be seen in the drawings, terminate in the cavity 54 (discussed further below) with an edge of the panel 22. The first and second side panels 24, 26 provide impact surfaces 25, 27, respectively, covering some or all of a side interior surface of the vehicle 100, e.g., some or all of windows 66. The first and second side panels 24, 26, like the panel 22, may have a surfaces that are generally arcuate, generally planar, or some combination of arcuate and planar. Further, the side panels 24, 26 may extend from the roof panel 22 at a substantially right angle or some other angle such that the airbag 20, including the roof panel 22 and the side panels 24, 26 generally cover at least portions of interior surfaces 70, 66, etc., of the vehicle 100 and/or provide at least a partial box-like shape of impact surfaces 21, 24, and 25 for passenger protection during a rollover event. Thus, the airbag 20 may create a space for the passenger surrounded by the roof panel 22 and the first and second side panels 24, 26.

The tether 30, as stated above, includes the first end 31 and the second end 33. The first end 31 attaches to a first attachment point 32 that is located on a surface of the airbag 20. The second end 33 attaches to a second attachment point 34 located or mounted on a vehicle 100 component as described further below, to anchor the tether 30. Respective locations of the tether 30 and the first and second attachment points 32, 34 are generally be determined to provide a desired inflated shape and/or position of the airbag 20. Controlling the shape of the airbag 20 with the tether 30 advantageously allows the impact surface 21 to be extended farther toward a front of the vehicle 100 upon deployment, and this during an impact, than would otherwise be possible. For example, the airbag 20 may extend over the head of the passenger and/or along the interior roof surface 70 to provide the impact surface 21.

Figure 5:
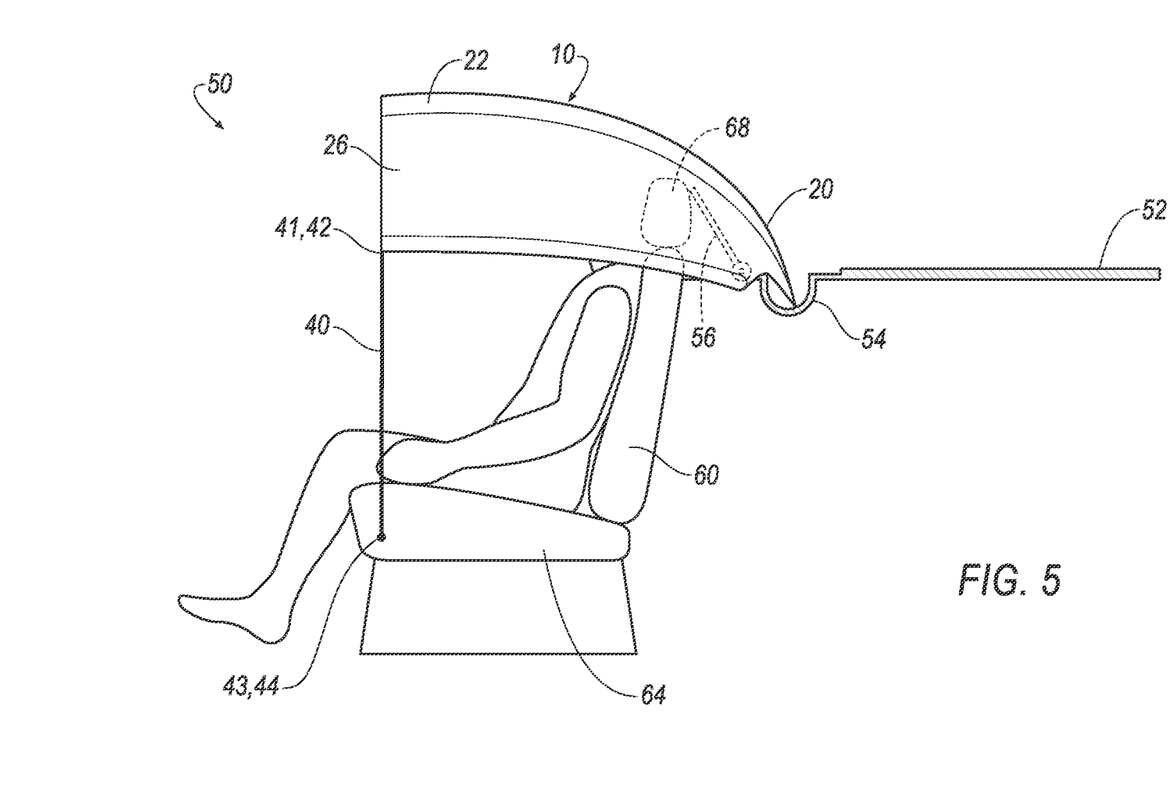
FIG. 5 is a side view of the passenger protection device of FIG. 4 in the deployed state.

The second attachment point 34 may be located, e.g., on the vehicle seatback 60, a rocker panel 62, or the seat cushion 64. The second attachment point 34 may also be on any suitable part of the vehicle 100 that allows for proper anchoring of the tether 30. In the example of FIG. 5, the second attachment point 34 is on the seat cushion 64.

As an alternative, or in addition, to the first tether 30, the passenger protection device 10 may include a second tether 40. The second tether 40 includes a first end 41 and a second end 43. The first end 41 is arranged for attachment to a third attachment point 42 on the surface of the airbag 20 that faces the vehicle roof when the airbag 20 is deployed. The second end 43 is arranged for attachment to a fourth attachment point 44. The use of the second tether 40 allows for further determination of the direction and shape of the airbag 20 after inflation. It is preferable to have both tethers 30 and 40, one on each of the first and second side panels 24, 26, for optimum bag shape providing maximum protection to the rear occupants during rollover and side crashes.

Figure 6:
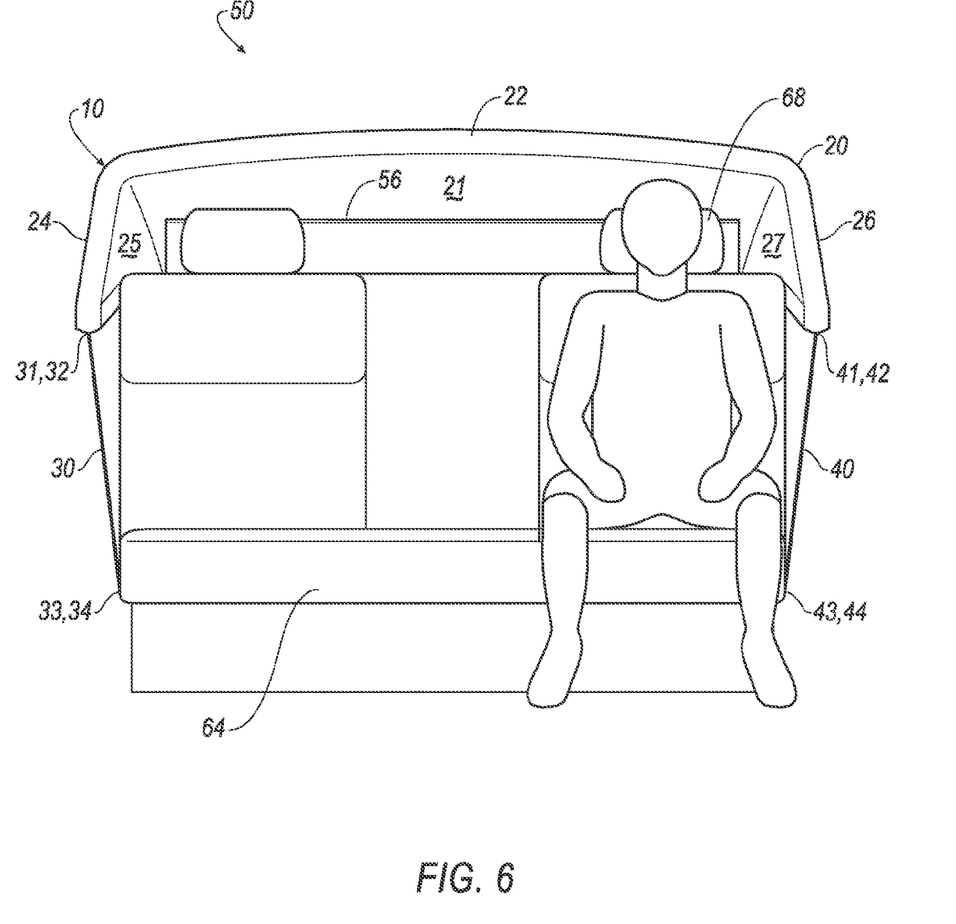
FIG. 6 is a front view of the passenger protection device of FIG. 4 in the deployed state.
Figure 7:
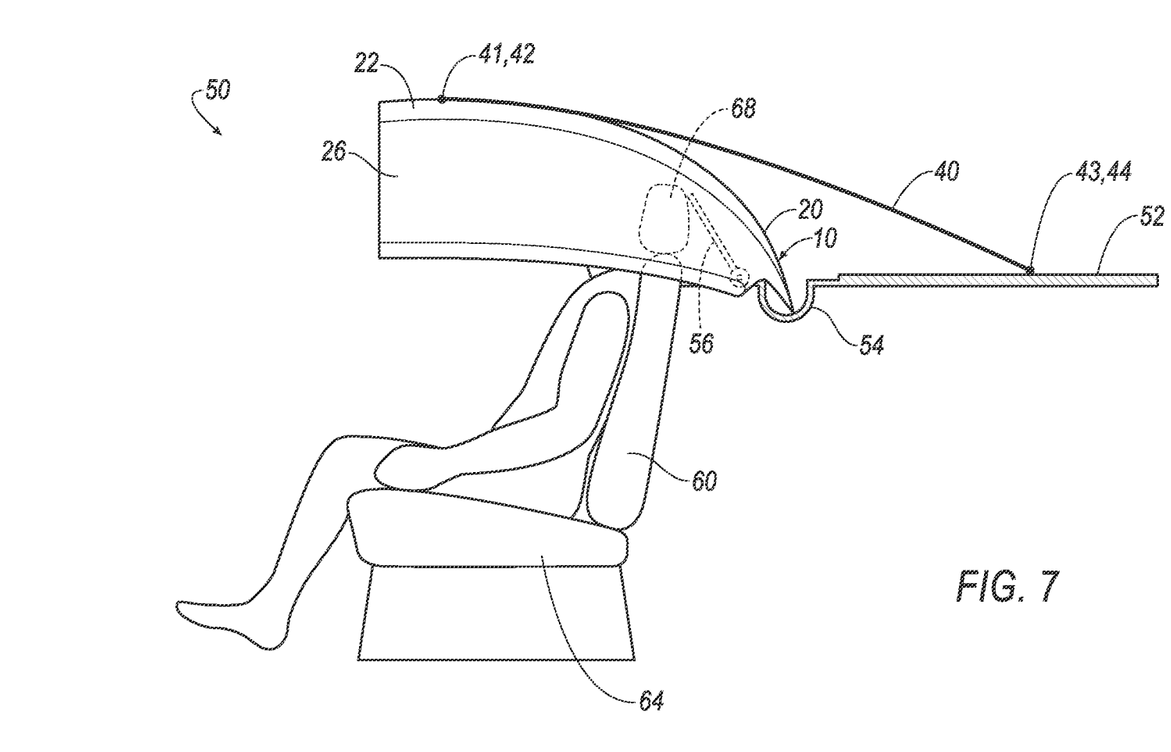
FIG. 7 is a side view of a second exemplary passenger protection device in the deployed state.

The first attachment point 32 of the tether 30 may be on the first side panel 24, and the third attachment point 42 may be on the second side panel 26 to further determine an inflated shape and/or extent toward a front of the vehicle 100 of the airbag 20, including the impact surface 21. When the tether 30 is attached to the first side panel 24 and the second tether 40 is attached to the second side panel 26, as in FIG. 6, the airbag 20 will be secured at a point in the vehicle 100 forward of the airbag 20, creating a greater impact surface 21 for passenger protection.

In general, use of tethers 30 and/or 40 allows the airbag 20, e.g., the panel 22, to have a greater length than would otherwise be possible, a "length" of the airbag 20 being defined in the present context as an extent of the airbag 20 from a rearmost point in the vehicle 100 covered by the impact surface 21 to a forward-most point in the vehicle covered by the impact surface 21 in a deployed state. As also mentioned herein, the tethers 30, 40 may allow for determination of a shape of the airbag 20, e.g., a shape of the impact surface 21 and/or the impact surfaces 25, 27. For example, one or more tethers 30, 40 could be used to cause one or more of the impact surfaces 21, 25, 27 to form a partially boxlike shape of the airbag 20 and/or to cover some or all of the vehicle 100 interior surface 70 and/or window surfaces 66.

The passenger protection device 10 generally further includes an inflator 36 and a fill tube 38, wherein the inflator 36 is arranged to inflate the airbag 20 via the fill tube 38 when an impact is detected. The inflator 36 and fill tube 38 may be located on or in the seatback 60. The inflator 36 and fill tube 38 are known for use with vehicle airbag systems, and may be of any suitable type. Further, an airbag controller (e.g., a programmable device including a processor and a memory) or the like may be provided, as is known, to detect various imminent or actual impacts, such as a rollover event, and to provide an instruction whereby deployment of an airbag such as the airbag 20 is triggered, e.g., the inflator 36 is ignited or otherwise triggered to fill the airbag 20 via the fill tube 38.

The package tray 52 is located behind the seatback 60. The package tray 52 houses the guide plate 56 in a stowed state of the system 50. Further, the package tray 52 includes the cavity 54, and, in a stowed state of the system 50 and device 10, the airbag 20. The package tray 52 can extend from the seatback 60 to the rear of the vehicle 100. The cavity 54 may be a recess formed into the package tray 52 or a cavity removed from the package tray 52. The airbag 20 may be stowed in the cavity 54 in any suitable manner, e.g., rolled up, folded, and/or compressed.

The guide plate 56 may be a rigid plate, e.g., formed of a plastic or the like, hingedly connected to the package tray 52. The guide plate 56 may be substantially flush with the package tray 52 in a stowed state of the system 50. The guide plate 56 protects the airbag 20 prior to deployment. During the rollover, the guide plate 56 may open to a predetermined angle, e.g., an angle arranged to direct the airbag 20 over a headrest 68 and avoid a passenger's head.

In one example, prior to deployment, the airbag 20 is rolled and stored in the cavity 54. The inflator 36 and the fill tube 38, such as are known, are connected to the airbag 20. The guide plate 56 is substantially flush with the package tray 52. Upon impact and rollover, the inflator 36 inflates the airbag 20 through the fill tube 38. The inflating airbag 20 raises the guide plate 56 to the predetermined angle with the package tray 52. The airbag 20 expands over the guide plate 56, which is generally arranged to open at an angle such that the airbag 20 also expands over a vehicle seatback 60 and the headrest 68 into the passenger compartment of the vehicle 100. The first and second side panels 24, 26 inflate, covering at least respective portion of the windows 66 of the vehicle 100. In this example, the tether 30 is attached to the first attachment point 32 on the first side panel 24 and the second attachment point 34 on a seat cushion 64. The second tether 40 is attached to the third attachment point 42 on the second side panel 26 and the fourth attachment point 44 on the seat cushion 64. As the airbag 20 inflates, the tether and second tether 40 stretch and become taut. The tether 30 and second tether 40 direct the airbag 20 over the passenger, providing the impact surface 21.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A passenger protection device, comprising:
   an airbag having a roof panel arranged to deploy from substantially behind a vehicle seatback and to cover at least a portion of an interior roof surface;
   a guide plate arranged to open to a predetermined angle upon deployment of the airbag; and
   at least one tether having a first end attached to a first attachment point on a surface of the airbag that faces the interior roof surface when the airbag is deployed, and a second end attachable to a second attachment point;
   wherein the second attachment point is located on one of the vehicle seatback, a vehicle rocker panel, a package tray, and a vehicle seat cushion.

2. The passenger protection device of claim 1, further comprising a first side panel extending at an angle from the roof panel and a second side panel extending at an angle from the roof panel opposite the first side panel.

3. The passenger protection device of claim 2, wherein the first attachment point is on the first side panel.

4. The passenger protection device of claim 1, wherein the second attachment point is located on the surface of the airbag that faces the interior roof surface when the airbag is deployed.

5. The passenger protection device of claim 1, wherein the at least one tether is arranged to determine at least one of a shape and an extent of an impact surface of the airbag.

6. The passenger protection device of claim 1, further comprising a second tether having a first end attached to a third attachment point on the surface of the airbag that faces the interior roof surface when the airbag is deployed, and a second end arranged for attachment to a fourth attachment point.

7. The passenger protection device of claim 1, further comprising an inflator and a fill tube, wherein the inflator is arranged to inflate the airbag via the fill tube when an impact is detected.

8. A vehicle rollover passenger protection system, comprising:
    a package tray disposed substantially behind a vehicle seatback;
    a cavity in the package tray;
    a guide plate hingedly connected to the package tray and covering the cavity arranged to open to a predetermined angle upon deployment of the airbag;
    an airbag having a roof panel; and
    at least one tether having a first end arranged for attachment to a first attachment point on a surface of the airbag that faces an interior roof surface when the airbag is deployed, and a second end arranged for attachment to a second attachment point;
    wherein the guide plate is arranged for direction of the airbag from the cavity into a passenger compartment of the vehicle;
    wherein the second attachment point is located on one of the vehicle seatback, a vehicle rocker panel, the package tray, and a vehicle seat cushion.

9. The rollover passenger protection system of claim 8, wherein the guide plate is arranged to guide the airbag over the seatback upon deployment.

10. The rollover passenger protection system of claim 8, wherein the guide plate is arranged to lie substantially flush with the package tray.

11. The rollover passenger protection system of claim 8, further comprising a headrest, wherein the guide plate is arranged to direct the airbag over the headrest when deployed.

12. The rollover passenger protection system of claim 8, further comprising an inflator and a fill tube arranged to inflate the airbag via the fill tube when an impact is detected.

13. The rollover passenger protection system of claim 8, wherein the airbag is stowed in the cavity beneath the guide plate prior to deployment.

14. The rollover passenger protection system of claim 8, further comprising a second tether having a first end arranged for attachment to a third attachment point on the surface of the airbag that faces the vehicle roof when the airbag is deployed, and a second end arranged for connection to a fourth attachment point.

15. The rollover passenger protection system of claim 14, wherein the first attachment point is on a first side panel and the third attachment point is on a second side panel.

16. The rollover passenger protection system of claim 8, wherein the second attachment point is located on the surface of the airbag that faces the interior roof surface when the airbag is deployed.

17. The rollover passenger protection system of claim 8, wherein the at least one tether is arranged to determine at least one of a shape and an extent of an impact surface of the airbag.

18. The rollover passenger protection system of claim 8, wherein a first side panel is arranged to cover at least a portion of a vehicle window upon deployment.

19. A passenger protection device, comprising:
    an airbag having a roof panel arranged to deploy to cover at least a portion of an interior roof surface; and
    at least one tether having a first end attached to a first attachment point on a surface of the airbag that faces the interior roof surface when the airbag is deployed, and a second end attachable to a second attachment point;
    wherein the second attachment point is located on one of a vehicle seatback, a vehicle rocker panel, and a vehicle seat cushion.

* * * * *